United States Patent
Saha et al.

(10) Patent No.: US 12,422,259 B2
(45) Date of Patent: Sep. 23, 2025

(54) SYSTEM AND METHOD FOR TIME SYNCHRONIZED FUSION OF MULTIPLE INERTIAL SENSORS

(71) Applicant: STMicroelectronics International N.V., Geneva (CH)

(72) Inventors: Swapnil Sayan Saha, Fremont, CA (US); Denis Ciocca, Santa Clara, CA (US); Mahesh Chowdhary, San Jose, CA (US)

(73) Assignee: STMicroelectronics International N.V., Geneva (CH)

( * ) Notice: Subject to any disclaimer, the term of this patent is extended or adjusted under 35 U.S.C. 154(b) by 373 days.

(21) Appl. No.: 18/065,557

(22) Filed: Dec. 13, 2022

(65) Prior Publication Data

US 2024/0191996 A1    Jun. 13, 2024

(51) Int. Cl.
G01C 21/00      (2006.01)

(52) U.S. Cl.
CPC .................................. G01C 21/005 (2013.01)

(58) Field of Classification Search
CPC ...... G01C 21/005; G01C 21/16; G01C 21/20; G06F 18/25; G06F 1/12
See application file for complete search history.

(56) References Cited

U.S. PATENT DOCUMENTS

| | | | |
|---|---|---|---|
| 9,336,295 B2 | 5/2016 | Grokop et al. | |
| 10,861,242 B2 | 12/2020 | Lacey et al. | |
| 2019/0170785 A1* | 6/2019 | Riccardi | G01D 18/00 |
| 2021/0080259 A1* | 3/2021 | Babu | G01C 21/1652 |
| 2022/0126864 A1 | 4/2022 | Moustafa et al. | |

FOREIGN PATENT DOCUMENTS

WO     WO-2016187411 A1 *  11/2016  ............ G06T 7/20

OTHER PUBLICATIONS

Yunas et al., Gait Activity Classification Using Multi-Modality Sensor Fusion: A Deep Learning Approach, Aug. 1, 2021, IEEE Sensors Journal, vol. 21, No. 15, pp. 16870-16879 (Year: 2021).*
Aceinna, Inc., Inertial Systems, "OpenIMU330B," © 2023 <<https://www.aceinna.com/inertial-systems/OpenIMU330B>> (4 pages).
El-Sheimy et al., "Analysis and Modeling of Inertial Sensors Using Allan Variance," *IEEE Transactions on Instrumentation and Measurement* 57(1):140-149, Jan. 2008.
Hasnur-Rabiain et al., "INS stochastic error detection during kinematic tests and impacts on INS/GNSS performance," *Geo-spatial Information Science* 16(3):169-176, 2013.

(Continued)

*Primary Examiner* — Mi'schita' Henson
(74) *Attorney, Agent, or Firm* — Seed Intellectual Property Group LLP

(57) ABSTRACT

A sensor system includes a plurality of inertial measurement units (IMU) and a control circuit. The control circuit is configured to receive sensor data from each of the inertial measurement units two alignment the timestamps of the sensor data, and to fuse the sensor data from the various IMUs. The control circuit detects whether the sensor data indicates a high degree movement or a low degree of movement and selects a high dynamic fusion process or a low dynamic fusion process based on the detected degree of movement.

21 Claims, 9 Drawing Sheets

(56) References Cited

OTHER PUBLICATIONS

Jerath et al., "GPS-Free Terrain-based Vehicle Tracking on Road Networks," *Proceedings of the American Control Conference*, Jun. 2012. (6 pages).

Patel et al., "Multi-IMU Based Alternate Navigation Frameworks: Performance & Comparison for UAS," *IEEE Access 10*:17565-17577, Jan. 2022.

Veth et al., "Alignment and Calibration of Optical and Inertial Sensors Using Stellar Observations," *Proceedings of ION GNSS 2005*, Jan. 2005. (11 pages).

\* cited by examiner

SYSTEM AND METHOD FOR TIME SYNCHRONIZED FUSION OF MULTIPLE INERTIAL SENSORS

BACKGROUND

Technical Field

The present disclosure is related to inertial sensor systems, and more particularly, to inertial sensor systems that include multiple inertial sensors.

Description of the Related Art

Inertial measurement units (IMUs) are used in a variety of applications. Such applications can include tactical grade navigation applications, automotive applications, autonomous driving, mobile mapping, robotics pose estimation, drone navigation underwater robotics, etc. However, using microelectromechanical systems (MEMS) IMUs in such sensitive applications is challenging.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide a sensor system that is able to fuse sensor data from a plurality of IMUs. The sensor system aligns the timestamps of the sensor data from the various IMUs. The sensor system detects whether the sensor data indicates low movement (substantially stationary) or high movement. The sensor system then utilizes a high dynamic fusion process or a low dynamic fusion process based on the amount of movement. This enables the sensor system to fuse the sensor data in a highly accurate and efficient manner.

In one embodiment, the sensor system includes a control circuit communicatively coupled to each of the IMUs. The control circuit includes a data fusion module for fusing the sensor data from the various IMUs.

In one embodiment, each IMU includes a sensor and an ASIC. The ASIC includes an analog-to-digital converter (ADC) and a FIFO. The ADC receives analog sensor signals from the sensor and converts the analog sensor signals to digital sensor data. The ADC is operated with a first clock signal having a first frequency. The ADC outputs the sensor data to the FIFO. The FIFO outputs the sensor data to the control circuit.

In one embodiment, the control circuit aligns the timestamps of the sensor data by providing a second clock signal to the FIFO of each IMU. The second clock signal has a second frequency that is much lower than the frequency of the first clock signal. Because the FIFO outputs data with an output data rate (ODR) that is significantly less than the ODR of the ADC, the outputs of each of the FIFOs are highly aligned. This can correspond to aligning the timestamps of the sensor data from each of the IMUs.

In one embodiment, the data fusion module includes a stationary detection module. The stationary detection module receives the sensor data with aligned timestamps and determines whether or not the sensor data indicates a low degree of movement (a substantially stationary state) or a high degree of movement. The data fusion module includes a high dynamic fusion module and a low dynamic fusion module. The high dynamic fusion module includes an algorithm tailored for the fusion of sensor data corresponding to a high degree of movement. The low dynamic fusion module includes an algorithm tailored for the fusion of sensor data corresponding to a low degree of movement. Accordingly, the data fusion module selectively utilizes the low dynamic fusion module or the high dynamic fusion module to fuse the sensor data in a highly accurate manner.

In one embodiment, the sensor fusion module introduces a quality factor for each of the sensor data channels. The quality factor can indicate which of the sensor data channels can be trusted and which of the sensor data channels are faulty.

In one embodiment, the sensor fusion module can avoid utilizing individual noise parameters. The adaptive noise formulation can avoid utilizing Allan variance parameters for modeling the individual sensor errors. The result is that noise is dealt with effectively and efficiently.

In one embodiment, the sensor system includes flexible architecture. The sensor system can function with any number of IMUs at any given time. The sensor system is effective even if one or more individual IMUs are not able to provide data at a given time.

In one embodiment, the fusion algorithm can avoid utilizing a complex system model for state estimation or measurement updates. Instead, the stationary detection module and the use of low dynamic and high dynamic fusion modules enables a simple system that is efficient and effective. Furthermore, the fusion algorithm can run on microcontrollers since the fusion algorithm utilizes low-power operations and uses low-power attitude estimation filters. Furthermore, the algorithm can avoid utilizing tuning because the algorithm adapts to changing motion primitives with the selected use of high dynamic and low dynamic fusion algorithms.

In one embodiment, the sensor system provides Euler angles as well as fused accelerometer and gyroscope readings. The Euler angles and the fused accelerometer and gyroscope readings can be utilized in a large number of applications.

The sensor system in accordance with principles of the present disclosure enables the use of MEMS IMUs in applications that call for a high degree of precision. Typically MEMS IMUs have not been used in such applications. However, the timestamp and data fusion modules according to principles of the present disclosure enable the use of MEMS IMUs even in highly sensitive applications.

BRIEF DESCRIPTION OF THE SEVERAL VIEWS OF THE DRAWINGS

Reference will now be made by way of example only to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
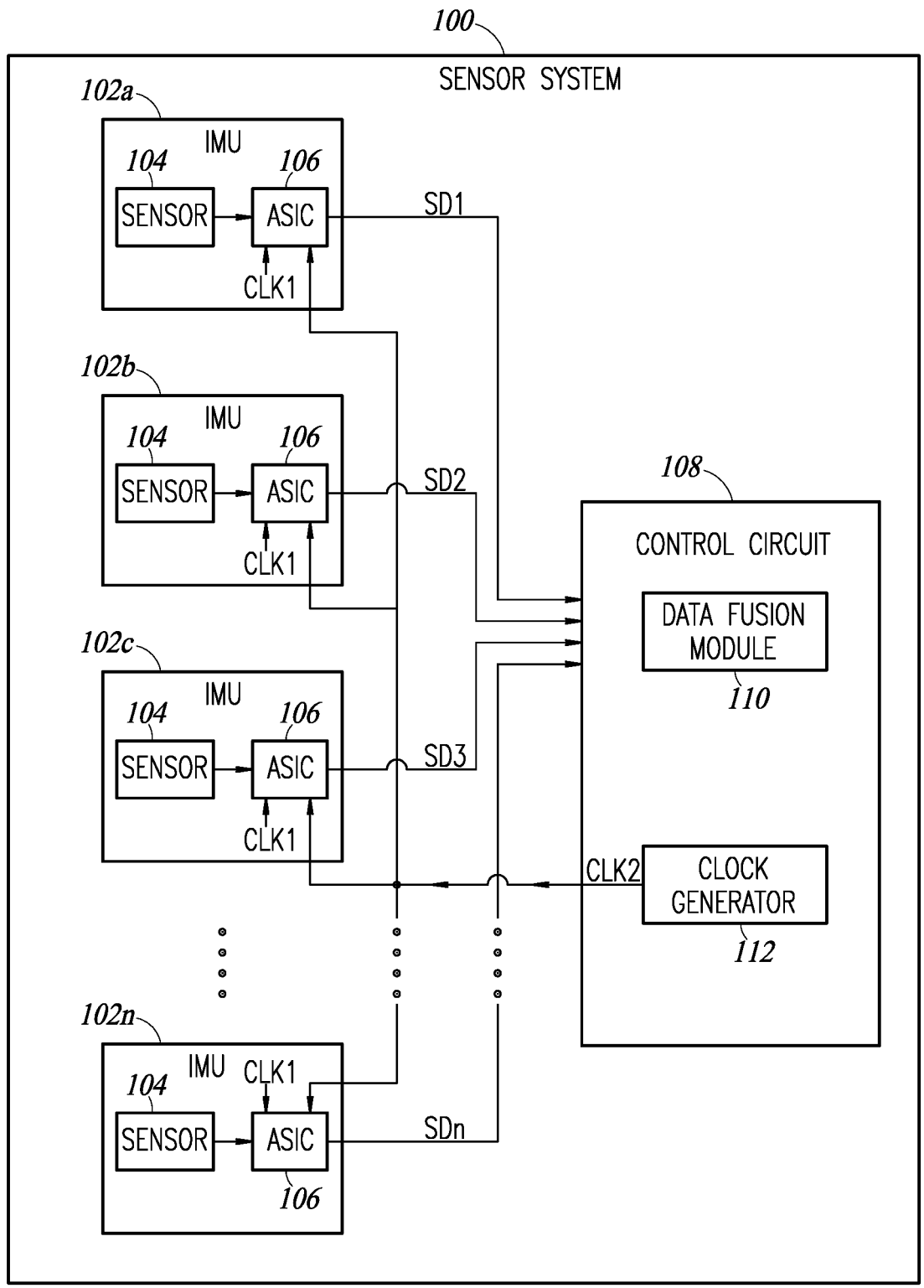
FIG. 1 is a block diagram of a sensor system, according to one embodiment.

FIG. 1 is a block diagram of a sensor system 100, according to one embodiment. The sensor system 100 includes a plurality of IMUs 102 and a control circuit 108. The IMUs generate sensor data SD and provide the sensor data SD to the control circuit 108. As will be set forth in more detail below, the components of the sensor system 100 cooperate to fuse the sensor data SD from the various IMUs in an effective and efficient manner.

In one embodiment, the sensor system 100 is part of an electronic device. The electronic device can include a vehicle, a machine, a component of a vehicle or machine, a mobile phone, a smartwatch, a tablet, a laptop computer, or other type of device. The sensor system 100 is configured to sense the motion of the electronic device. The sensor system 100 can be communicatively coupled to other components of the sensor system 100, such as control systems of the electronic device. The sensor system 100 can also be communicatively coupled to other systems external to the electronic device.

The sensor system 100 includes n IMUs 102. The IMUs 102 are individually labeled 102a, 102b, 102c, . . . 102n. However, the description will only include the suffix (a, b, c, . . . n) when speaking specifically about a particular IMU. Accordingly, the reference number 102 will be used generally for the IMUs. Furthermore, the IMUs each output sensor data SD. The IMU 102a outputs sensor data SD1. The IMU 102b outputs sensor data SD2. The IMU 102c outputs sensor data SD3. The IMU 102n output sensor data SDn. However, description will only use the suffix (1, 2, 3, . . . n) for the sensor data SD when referring specifically to the sensor data SD of a particular IMU 102.

Each IMU 102 includes one or more sensors 104. The one or more sensors 104 can include inertial sensors. The sensors 104 can include an accelerometer. The accelerometer can include a three axis accelerometer that senses motion in three mutually orthogonal axes. Alternatively, the accelerometer can include a single axis accelerometer or another type of accelerometer.

In one embodiment, the sensors 104 include a gyroscope. The gyroscope can include a three axis gyroscope that senses rotation around three mutually orthogonal axes. Alternatively, the gyroscope can include a single axis gyroscope or another type of gyroscope.

In one embodiment, the sensors 104 may include multiple accelerometers, multiple gyroscopes, an accelerometer and a gyroscope, or multiple accelerometers and multiple gyroscopes. The sensors 104 may include various types and combinations of inertial sensors.

In one embodiment, the sensors 104 include a MEMS sensor. Accordingly, the accelerometers and gyroscopes described above can include MEMS accelerometers and gyroscopes. A single integrated circuit die may include a plurality of MEMS accelerometers and gyroscopes. Alternatively, accelerometers and gyroscopes may be implemented in separate integrated circuit dies.

The sensors 104 generate sensor data based on the motion of the electronic device in which the sensor system 100 is implemented. The sensors 104 may initially generate analog sensor signals based on the motion of the sensors 104.

In one embodiment, each IMU 102 includes an application specific integrated circuit (ASIC) 106. The ASIC 106 may include digital signal processing circuitry that receives the analog sensor signals and generates digital sensor data based on the analog sensor signals. This can include performing analog-to-digital conversion (ADC), signal filtering, and other types of digital signal conditioning. Accordingly, in one embodiment, the ASIC 106 includes an ADC, one or more digital filters, a first in, first out (FIFO) memory, or other types of circuitry.

In one embodiment, the sensors 104 and the ASIC 106 of an IMU 102 are implemented in a single integrated circuit die. Accordingly, a single integrated circuit die may include one or more accelerometers, one or more gyroscopes, and an ASIC 106. Further details regarding the ASIC 106 are set forth below.

The sensor system 100 includes a control circuit 108. The control circuit 108 receives the sensor data SD from the IMUs 102 and processes the sensor data SD. The control circuit 108 can include a microcontroller, a microprocessor, or another type of processing circuitry. The control circuit 108 can include memory. The memory can include registers, buffers, flash RAM, SRAM, DRAM or other types of memory.

Traditional MEMS based IMUs may generally have higher noise and the cumulative error characteristics compared to other types of inertial sensors that are utilized in high-end applications in which high degrees of accuracy may be utilized. This may limit the applications with which single MEMS IMUs can be used. It is difficult for individual MEMS sensors to capture the full range of kinematics of a device or object.

Fusion of the sensor data SD can help improve the overall quality of the sensor data SD. There are various possible solutions for fusing the sensor data SD. One possible fusion strategy is virtual inertial measurement unit (VIMU) mean processing. However, traditional VIMU mean processing alone provides no notion about which sensors to trust more, may have poor theoretical performance when the number of sensors are low, may not be a minimum various unbiased estimator when the number of sensors are low, and assumes timestamp alarmed data.

Another possible fusion strategy is an augmented Kalman filter. However, traditional augmented Kalman filtering utilizes Allan variance parameters of the individual sensors, may include inflexible architecture that assumes data from all sensors, may fail when one sensor stops providing data, and may be hardcoded for attitude estimation or specific applications.

Another possible data fusion solution may include a federated Kalman filter. However, a federated Kalman filter may be expensive due to utilizing n local Kalman filters with expensive matrix operations, may be hardcoded for attitude estimation or specific applications, may utilize a well-defined system model, and may utilize Allan variance parameters of the individual sensors.

Another possible fusion strategy is a federated Kalman filter with reset functionality. However, a federated Kalman filter with reset functionality may utilize careful tuning to ensure that results do not diverge, may utilize Allan variance parameters of the individual sensors, may be expensive due to utilizing n Kalman filters with expensive matrix operations, and may be hardcoded for attitude estimation or specific applications.

The control circuit 108, in accordance with principles of the present disclosure, overcomes the drawbacks of other possible fusion solutions. The control circuit 108 performs data fusion of the sensor data SD from each of the IMUs 102 in an effective and efficient manner that results in highly accurate sensor data fusion. The data fusion process of the control circuit 108 can effectively reduce noise, reduce error accumulation, and otherwise greatly improves the overall quality of the sensor data SD.

The control circuit 108 utilizes a timestamp alignment process that effectively and efficiently aligns the timestamps of the sensor data SD from each of the IMUs 102. Once the timestamps of the sensor data have been aligned, the control circuit 108 performs a stationary detection operation. The stationary detection operation can include determining whether the electronic device has a low degree of movement (i.e., is substantially stationary) or has a high degree of movement. If there is a low degree of movement, then the control circuit 108 performs a low dynamics data fusion process. If there is a high degree of movement, then the control circuit 108 performs a high dynamics data fusion process. The control circuit 108 can output few sensor data and Euler angles.

The data fusion process performed by the control circuit 108 overcomes many of the drawbacks of other possible solutions. For example, the timestamp alignment process is inexpensive even for large numbers of IMUs. The control circuit 108 provides a quality factor measurement that enables the user to identify which of the IMU channels is trustworthy and which are faulty. The fusion process can be effectively implemented without utilizing individual noise parameters. The adaptive noise formulation can be performed without Allan variance parameters for modeling individual sensor errors. The control circuit 108 enables a flexible architecture that can be used with any number of IMUs 102 at any given time, even when some of the IMU channels may not be able to provide sensor data SD at a given time. Furthermore, the data fusion process can be performed without a system model, such as a complex system model for state estimation or measurement updates. The data fusion process is computationally inexpensive and can run on microcontrollers since it utilizes low power computational operations and uses low power attitude estimation filters. The data fusion process can be performed about tuning because the algorithm adapts to changing motion primitives by selectively utilizing high and low dynamic fusion processes. The fusion alignment process can be applied to a large number of general applications. The data fusion process provides both Euler angles and fused accelerometer and gyroscope readings which can be used for a large number of applications.

In one embodiment, the control circuit 108 includes a data fusion module 110. The data fusion module 110 may perform data fusion of the sensor data SD from each of the IMUs 102, as described above. The data fusion module 110 may directly perform some aspects of data fusion operations and may control other aspects of data fusion processes. The data fusion module 110 may be implemented with processing, memory, and communication resources of the control circuit 108. For example, the data fusion module 110 may be implemented, at least in part, by executing software instructions stored in memory resources of the control circuit 108 utilizing processing resources of the control circuit 108.

In one embodiment, timestamp alignment is performed, in part, by providing multiple clock signals of varying frequency to the ASIC 106 of each IMU 102. In one embodiment, the ASIC 106 receives a first clock signal CLK1 having a first frequency. The ASIC 106 may also receive a second clock signal CLK2 having a second frequency. In one embodiment, the second frequency is significantly lower than the first frequency. For example, the first frequency may be higher than the second frequency by a factor between 10 and 100 (i.e., the first frequency may be between 10 and 100 times higher than the second frequency). The effect of this will be described in further detail below.

In one embodiment, the control circuit 108 includes a clock generator 112. The clock generator 112 may generate the second clock signal CLK2 and may provide the second clock signal CLK2 to the ASICs 106 of each IMU 102. The rising and falling edges of the second clock signal CLK2 arrived at the ASICs 106 substantially simultaneously.

In one embodiment, the IMUs 102 generate the first clock signal CLK1. In particular, each ASIC 106 may generate the first clock signal CLK1. The first clock signal CLK1 may have the same frequency at each IMU 102.

In one embodiment, the first clock signal CLK1 is provided to an ADC of each ASIC 106. The first clock signal CLK1 may have a relatively high frequency between 2 kHz and 20 kHz. This causes the ADC to output sensor data samples with an ODR corresponding to the frequency of the first clock signal CLK1. In one embodiment, each ASIC includes a FIFO that receives the sensor data from the ADC. The FIFO receives the second clock signal CLK2. The FIFO samples the output of the ADC at the much lower frequency of the second clock signal CLK2. Accordingly, the FIFO has an ODR corresponding to the frequency of the second clock signal CLK2. In one embodiment, the second clock signal CLK2 has a frequency between 50 Hz and 150 Hz. The FIFO of each ASIC 106 outputs the sensor data SD to the control circuit 108.

Because the FIFOs of the ASICs 106 sample the ADCs at a significantly lower frequency than the ODR of the ADCs, and because the FIFOs of the ASICs 106 receive the second clock signal CLK2 with a high degree of alignment, the timestamps of the sensor data SD are highly aligned when received at the control circuit 108. Accordingly, the utilization of a high frequency clock signal and a low frequency clock signal at the ASICs 106 of the IMUs allows for timestamp alignment of the sensor data SD. In one embodiment, the data fusion module 110 may perform further timestamp alignment on the sensor data SD received from the IMUs 102.

The data fusion module 110 analyzes the line sensor data SD to determine whether the sensor data SD represents a low degree of motion or a high degree of motion. If the sensor data represents a low degree of motion, then the data fusion module utilizes a low dynamics fusion process or algorithm to fuse the sensor data SD. If the sensor data represents a high degree of motion, then the data fusion module utilizes a high dynamics fusion process or algorithm to fuse the sensor data SD. Further details regarding the high and low dynamics fusion processes are provided below.

Figure 2:
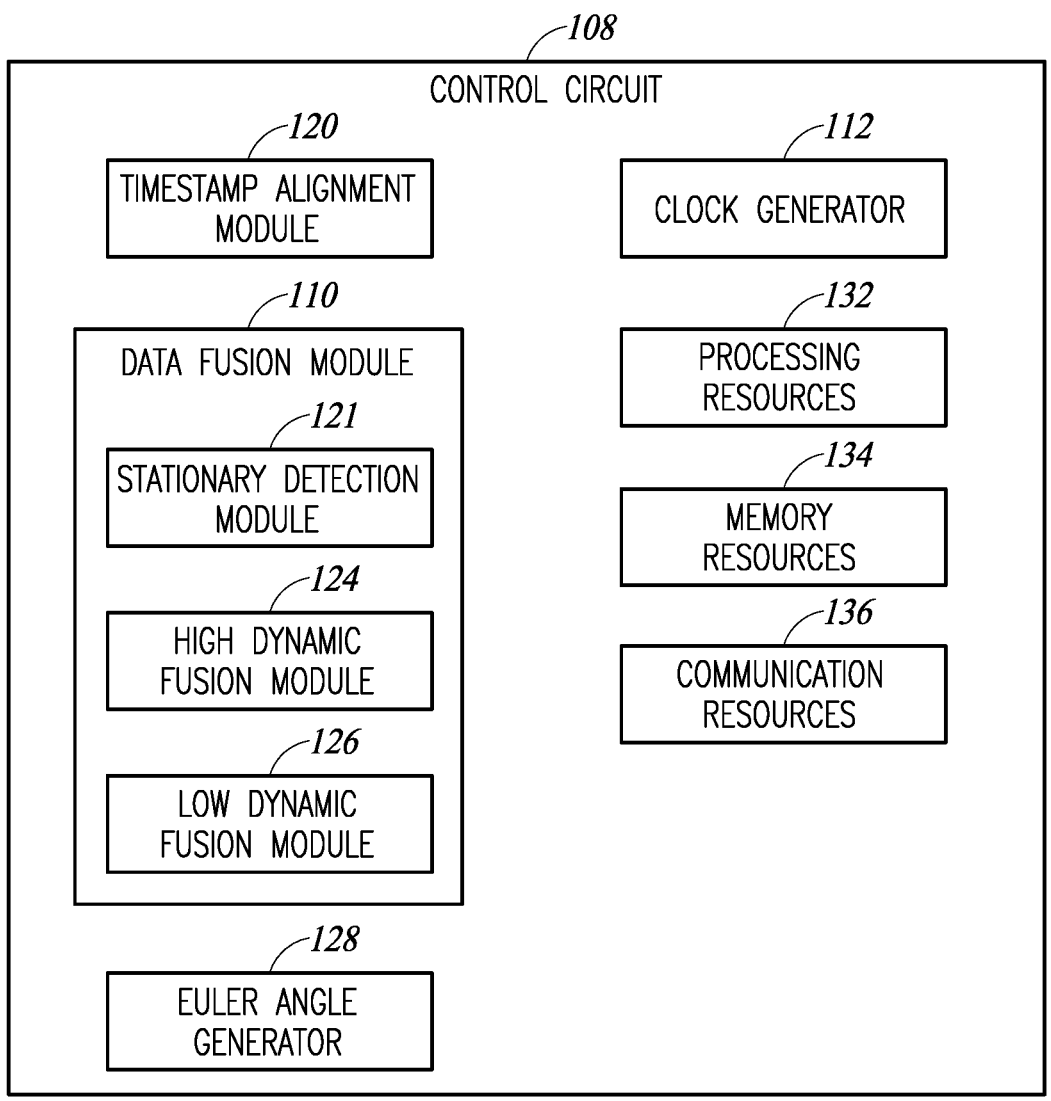
FIG. 2 is a block diagram of a control circuit of a sensor system, according to one embodiment.

FIG. 2 is a block diagram of a control circuit 108, according to one embodiment. The control circuit one of FIG. 2 is one example of a control circuit one of FIG. 1. The control circuit one includes a clock generator 112. The clock generator 112 may generate the second clock signal CLK2 described in relation to FIG. 1. The clock generator 112 may also generate one or more high frequency clock signals for components of the control circuit 108. For example, the clock generator 112 may generate a clock signal having a frequency between 1 MHz and 16 MHz for the control circuit 108. Other frequencies can be utilized without departing from the scope of the present disclosure.

The control circuit one may include a timestamp alignment module 120. The timestamp alignment module 120 may receive sensor data SD from the IMUs 102. As described previously, due to utilization of the first and second clock signals, the sensor data SD may arrive from the IMUs 102 in a high degree of alignment. The timestamp alignment module 120 may perform additional timestamp alignment or may pass the sensor data SD to the data fusion module 110.

The data fusion module includes a stationary detection module 121. The stationary detection module 121 receives the aligned sensor data from the timestamp alignment module 120 and determines whether the sensor data represents a high degree of motion or a low degree of motion.

The data fusion module 110 includes a high dynamics fusion module 124 and a low dynamics fusion module 126.

The high dynamics fusion module 124. If the stationary detection module 121 determines that the sensor data represents a high degree of motion, then the fusion module 110 selects the high dynamics fusion module 124 to perform data fusion on the sensor data SD. If the stationary detection module 121 detects a low degree of motion, then the fusion module 110 selects the low dynamics fusion module 126 to perform data fusion on the sensor data SD. Further details regarding high dynamics and low dynamics fusion are provided in relation to FIG. 4.

The control circuit 108 includes an Euler angle generator 128. The Euler angle generator 128 receives the fused sensor data from the fusion module 110 and generates Euler angles from the fused sensor data. The Euler angle generator 128 outputs the Euler angle values.

The control circuit 108 includes processing resources 132. The processing resources 132 can include one or more microcontrollers, one or more microprocessors, one or more ISPUs, or other types of processing resources. The processing resources 132 may perform or control the operations of the control circuit 108.

The control circuit 108 includes memory resources 134. The memory resources 134 can include one or more buffers, registers, SRAM arrays, DRAM arrays, flash memory arrays, or other types of memory that can store data and that can be read by the processing resources 132. The memory resources 134 may store software instructions for implementing functionality of the sensor system 100 including the control circuit 108. The memory resources 134 may store data corresponding to one or more algorithms associated with the components of the control circuit 108.

The sensor system 100 may include communication resources 136. The communication resources 136 can include circuitry for transmitting signals or data between components of the sensor system 100, between the sensor system 100 and components of the electronic device, or between the sensor system 100 and a device external to the electronic device. Accordingly, the communication resources 136 may include circuitry protocols for wired transmission, wireless transmission, or other types of transmissions. The control circuit 108 can include other components without departing from the scope of the present disclosure.

Figure 3:
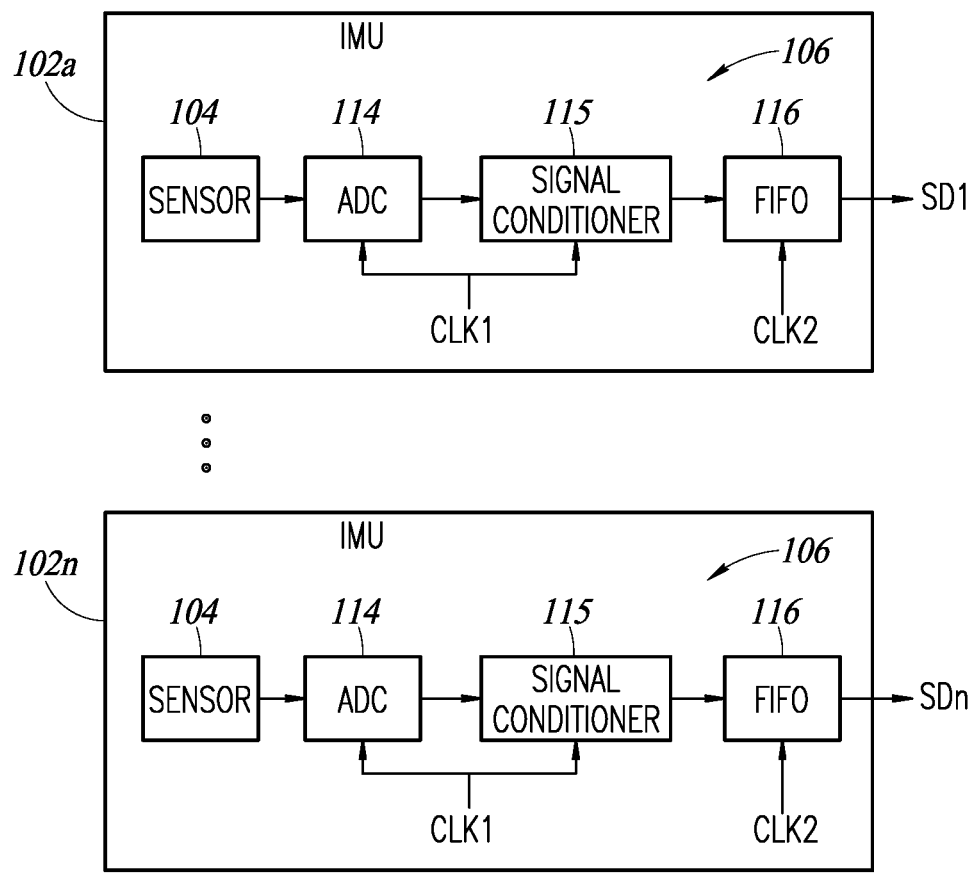
FIG. 3 is a block diagram of an inertial measurement units, according to one embodiment.

FIG. 3 is a block diagram illustrating two IMUs 102 of a sensor system 100, according to one embodiment. The IMUs 102 of FIG. 3 are one example of IMUs 102 of FIG. 1. Each IMU 102 includes a sensor 104, an ADC 114, a signal conditioner 115, and a FIFO 116. The ADC 114, the signal conditioner 115, and the FIFO 116 may be part of an ASIC 106.

The sensor 104 of each IMU 102 can include one or more inertial sensors as described previously. The sensors 104 generate analog sensor signals. In an example in which a sensor 104 includes a three axis accelerometer and a three axis gyroscope, the sensor 104 outputs a respective analog sensor signals for each sensing axis of the accelerometer and for each sensing axis of the gyroscope.

The ADC 114 of each IMU receives the analog sensor signals from the sensor 104. The ADC 114 also receives the first clock signal CLK1. The ADC 114 generates digital sensor data from the analog sensor signals. In an example in which the sensor 104 includes a three axis accelerometer and a three axis gyroscope, each sample of the sensor data generated by the ADC 114 includes a respective data value for each sensing axis of the accelerometer and for each sensing axis of the gyroscope. The ADC 114 generates a number of samples per second corresponding to the frequency of the clock signal CLK1. In one example, the frequency of the clock signal CLK1 a 6.6 kHz. Accordingly, the ADC 114 generates 6600 data samples per second. Other clock frequencies can be utilized without departing from the scope of the present disclosure.

In one embodiment, each IMU includes a signal conditioner 115 coupled to the output of the ADC 114. The signal conditioner 115 receives the digital sensor data from the ADC 114, conditions the digital sensor data, and outputs the conditioned digital sensor data. The signal conditioner 115 can include a digital signal processor (DSP) or other circuitry that may condition the digital sensor data output by the ADC 114. The signal conditioner 115 may receive the clock signal CLK1. The signal conditioner 115 may perform filtering, alignment, bias removal, or other conditioning processes on the sensor data.

Each IMU 102 includes a FIFO 116 coupled to the output of the signal conditioner 115. The FIFO 116 receives the second clock signal CLK2. As described previously, the second clock signal CLK2 has a frequency that is significantly lower than the frequency of the first clock signal CLK1. In one example, the frequency of the second clock signal CLK2 is 100 Hz. Accordingly, the FIFO 116 samples the output of signal conditioner 115 which receives data from the ADC 114 100 times per second. Accordingly, the FIFO 116 outputs 100 samples of the sensor data SD per second. The FIFO 116 of each IMU 102 receives the edge of the second clock signal CLK2 substantially simultaneously. This, combined with the significantly lower frequency of the second clock signal CLK2 with respect to the first clock signal CLK1, results in a high degree of alignment of the source data SD from each IMU 102. Although a signal conditioner 115 is positioned between the ADC 114 and the FIFO 116, the FIFO 116 may be described as receiving sensor data from the ADC 114. In one embodiment, the signal conditioner 115 may not be present.

In one embodiment, the first clock signal CLK1 has a frequency f1 and the second clock signal CLK2 has a frequency f2. Because f1 is significantly larger than f2 (i.e., f1>>f2), the maximum time stamp misalignment error of the sensor data SD is approximately 1/f2. Accordingly, the sensor data SD output by each FIFO 116 is highly aligned. This corresponds to a high degree of time stamp alignment of the sensor data SD. In one embodiment, f1 is at least 50 times greater than f2.

In one embodiment, a bus system or protocol couples the IMUs 102 to the control circuit 108. The bus system may include an 13C bus system used to interface multiple IMUs 102 to the control circuit 108. The 13C bus protocol offers synchronous time control where the control circuit 108 emits a periodic time sync. This allows all IMUs 102 to sync their sampling time relative to the time sync. This helps ensure that samples occur close together in time, permitting data collected at the same time to be fused.

Figure 4:
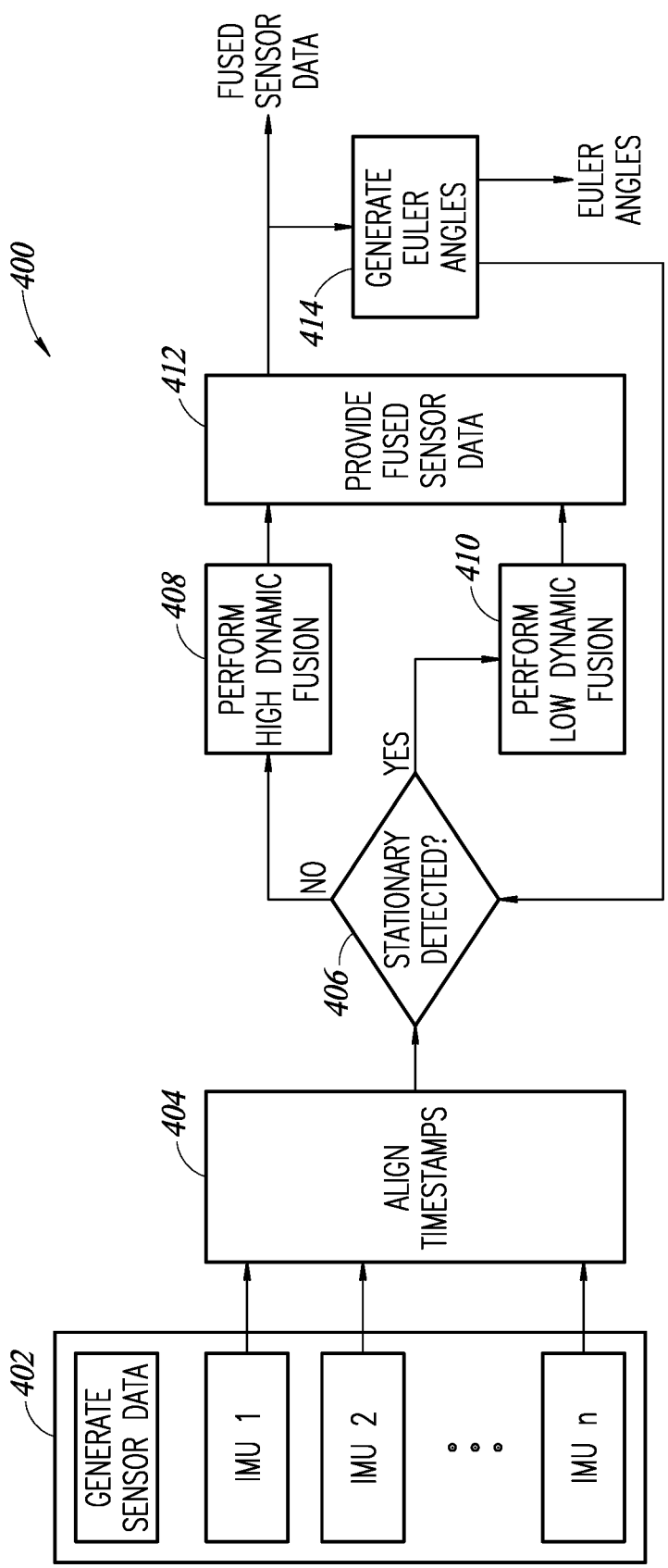
FIG. 4 is a functional flow diagram of a sensor system, according to one embodiment.

FIG. 4 is a functional flow diagram 400 of a sensor system, according to one embodiment. The flow diagram 400 represents a data fusion process for sensor data generated by a plurality of IMUs. At 402, the process 400 generates sensor data. This can correspond to n IMUs 102 each generating sensor data SD as described in relation to FIGS. 1-3. At 404, the process 400 performs time stamp alignment. Time stamp alignment can include utilization of the multiple clock signals CLK1 and CLK2 to align the outputs of the IMUs, as described in relation to FIGS. 1-3.

At 406, the process 400 performs a stationary detection operation. The stationary detection operation determines if the source data SD represents a low dynamics (i.e., substantially stationary) situation. Stationary detection can include computing one or both of the overall linear acceleration and angular rate based on the sensor data SD. If either or both of the angular rate and linear acceleration surpass respective angular rate threshold or linear acceleration threshold, then a high dynamic situation may be detected. Various methods for determining whether a low dynamic or high dynamic state is present can be utilized without departing from the scope of the present disclosure.

At 406, if a stationary state is not detected then the control circuit 108 selects a high dynamic fusion algorithm in the process proceeds to 408. The high dynamics fusion algorithm utilizes an augmented Kalman filter formulation. This may be considered a VIMU augmented Kalman process. In order to understand the high dynamics fusion algorithm, it is beneficial to understand various terms. In common equations, X is a state vector (fused sensor data), F is a matrix representing a model of the system (includes moments of inertia I for the system), Q is a matrix representing the process noise, P is matrix representing the error covariance, R is the measurement noise, y is the time aligned sensor measurements prior to fusion, H is a matrix representing an observation model, and K is the Kalman gain.

The input to the Kalman filter is the time aligned sensor measurements (sensor data SD) y. The output of the Kalman filter is the clean, fused sensor measurements X from all IMUs. The discussion of the Kalman filter will be given for an example in which each of the n IMUs outputs six data values per sample (three accelerometer axis values and three gyroscope axis values). In this case, the matrix F is an identity matrix of dimensions 6×6. The observation matrix H is also an identity matrix:

$$H_{6n \times 6} = \begin{bmatrix} I^1_{6 \times 6} \\ I^2_{6 \times 6} \\ \vdots \\ I^n_{6 \times 6} \end{bmatrix}$$

The clean, fused acceleration and gyroscope data is given by the state vector X, where $\bar{a}_i$ corresponds to a fused acceleration value for a given axis and $\bar{\omega}_i$ corresponds to a fused angular rate value for a given axis.

$$X_{6 \times 1} = [\bar{a}_x, \bar{a}_y, \bar{a}_z, \bar{w}_x, \bar{w}_y, \bar{w}_z]$$

The time aligned sensor data (pre-fusion) y is as follows:

$$y_{4n \times 1} = [A_1, A_2, \ldots, A_n],$$

where $A_k$ gives the sensor values for each of the n sensors, in the following manner:

$$A_k = [\bar{a}_{x,k}, \bar{a}_{x,k}, \bar{a}_{x,k}, \bar{w}_{x,k}, \bar{w}_{x,k}, \bar{w}_{x,k}]$$

where $a_{ik}$ are accelerometer values for the corresponding axis and IMU and $\omega_{ik}$ are gyroscope values for the corresponding axis and IMU. The process noise Q is as follows:

$$Q_{6 \times 6} = \mathrm{diag}(n_{x,a}^2 \Delta t, n_{y,a}^2 \Delta t, n_{z,a}^2 \Delta t, BI_{x,w}^2 + ARW_{x,w}^2 \Delta t,$$
$$BI_{z,w}^2 + ARW_{x,w}^2 \Delta t, BI_{y,w}^2 + ARW_{y,w}^2 \Delta t, BI_{z,w}^2 +$$
$$ARW_{x,w}^2 \Delta t).$$

where Δt is the time distance between samples, BI is the bias instability, ARW is the angle random walk. The measurement noise R is as follows:

$$R_{6k \times 6k} = \mathrm{diag}(B_1, B_2, \ldots, B_n)$$

where Bk is the variance for the sensor data. Bk is given by the following: where $1_{a,k,x}$ and $1_{\omega,k,x}$ are individual accelerometer and gyroscope variances for the various accelerometer and gyroscope axes for the IMUs. $l_{a,k,u}$ for an axis u is given by the following $$B_k = \text{diag}(l_{a,k,x}, l_{a,k,y}, l_{a,k,z}, l_{w,k,x}, l_{w,k,y}, l_{a,k,z}),$$

relationship:

$$l_{a,k,u} = n_{a,k,u}^2 \Delta t \times \frac{\sum_{i=1, i \neq k}^{n} \sigma^2(a_u)^i}{\sum_{j=1}^{n} \sigma^2(a_u)^j}$$

where $\sigma^2$ is the Allan variance. $l_{\omega,k,x}$ for an axis u is given by the following relationship:

$$l_{\omega,k,u} = \left(BI_{\omega,k,u}^2 + ARW_{\omega,k,u}^2 \Delta t\right) \times \frac{\sum_{i=1, i \neq k}^{n} \sigma^2(\omega_u)^i}{\sum_{j=1}^{n} \sigma^2(\omega_u)^j}$$

The high dynamic fusion process utilizes R to try to minimize the variance of the clean, fused sensor data. Accordingly, the high dynamic fusion process can include a minimum variance unbiased estimator. Accordingly, the high dynamics fusion algorithm is adaptive in that it is able to look at the variance of the time aligned sensor data and fuse their information to give the clean, fused sensor data.

Finally, using the information above, the Kalman equations can be used to generate the cleaned, fused sensor data X. First, the predicted state vector $\overline{X}_t$ for a sample at time t is given as follows:

$$\overline{X}_t = F X_{t-1}$$

where $X_{t-1}$ is the state vector for the previous sample. The predicted error covariance P, is given as follows:

$$\overline{P}_t = F P_{t-1} F^{-1} + Q$$

where $P_{t-1}$ is the error covariance for the previous sensor data sample. The Kalman gain KI is given as follows:

$$K_t = \overline{P}_t H^T (H \overline{P}_t H^T + R_t)^{-1}$$

where $H^T$ is the transpose of the observation model H. Finally, the state vector $X_t$ (clean, fused sensor data) for a sample of sensor data at time t is given as follows:
The error covariance Pt for a sample of sensor data at time t is given as follows: Using the formulas above, the high dynamics fusion algorithm is able to generate fused $$X_t = \overline{X}_t + K(y_t - H\overline{X}_t)$$

$$P_t = (I - K_t H)\overline{P}_t$$

sensor data from the IMUs 102 that is clean and accurate. Other types of high dynamic fusion algorithms can be utilized without departing from the scope of the present disclosure.

While the formulas above are useful for performing sensor data fusion in high dynamic situation, it is beneficial to use a separate data fusion algorithm for low dynamic situations. Accordingly, if a low dynamic or stationary state is detected at 406, the control circuit 108 implements a low dynamic fusion process at 410.

In one embodiment, the low dynamics fusion process generates the state vector X by averaging the values of acceleration from each IMU for a given axis by averaging the values of angular rate for a given axis. The acceleration value du corresponds to a fused acceleration value for a given axis and is given by the following relationship:

$$\overline{a_u} = \frac{1}{n} \sum_{i=1}^{n} a_u^i,$$

where, n is the number of IMUs. The angular rate value $\overline{\omega}_i$ corresponds to a fused angular rate value for a given axis and is given by the following relationship:

$$\overline{\omega_u} = \frac{1}{n} \sum_{i=1}^{n} \omega_u^i$$

The averaging process of the low dynamics fusion algorithm helps cancel out the effects of drift of gyroscopes during stationary periods void of roll, pitch, and the uncertainties. In one embodiment, the high dynamics fusion algorithm initiates via the low dynamics fusion algorithm when the framework starts.

At 412, the process 400 outputs the fused sensor data. At 414, the process 400 can utilize the fused sensor data to generate Euler angles.

In one embodiment, the data fusion module 110 can also generate a quality factor $Q^K$ to estimate the trustworthiness of each IMU 102 at each time step during runtime. The quality factor $Q^K$ is given by the following relationship:

$$Q^k = \frac{1}{3}\alpha_1\left(1 - \frac{\sigma^2(a_u)^k}{\sum_{k=1}^{n} \sigma^2(a_u)^k}\right) + $$

$$\frac{1}{3}\alpha_1\left(1 - \frac{\sigma^2(w_u)^k}{\sum_{k=1}^{n} \sigma^2(w_u)^k}\right) + \alpha_2\frac{|\phi^k - \overline{\phi}|}{2\pi} + \alpha_3\frac{|\theta^k - \overline{\theta}|}{2\pi} + \alpha_4\frac{|\psi^k - \overline{\psi}|}{2\pi}$$

where the sum of $\alpha_1$, $\alpha_2$, $\alpha_3$, and $\alpha_4$ is 1 and $\theta$, $\psi$, and $\phi$ are Euler angles. The final three terms estimate the individual Euler angle deviation from the fused Euler angles. During high dynamic situations, the first two terms dominate. During static conditions, the last three terms dominate can act as a pseudo-Allan variance parameter estimator. To save power and computation resources, a single filter is utilized rather than and local filters to estimate states from each IMU reading during a quality factor calculation.

Figure 5A:
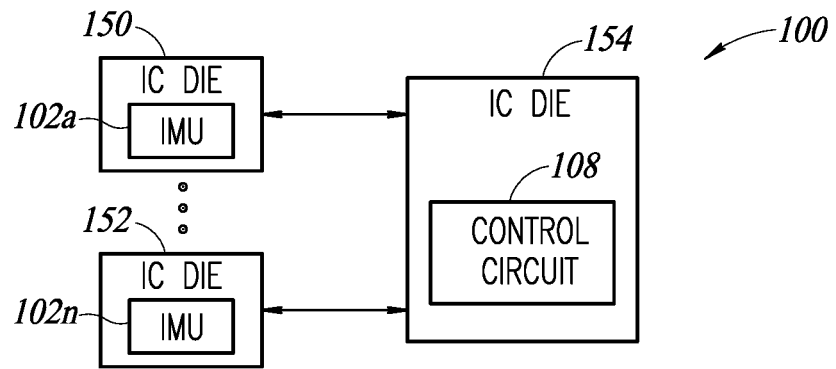
FIG. 5A is a block diagram of a sensor system, according to one embodiment.

FIG. 5A is a block diagram of a sensor system 100, according to one embodiment. In FIG. 5A each IMU 102 is implemented in a separate integrated circuit die (IC). The IMU 102a is implemented in a first integrated circuit die 150. The IMU 102n is implemented in an integrated circuit die 152. The control circuit 108 is implemented in an integrated circuit die 154.

Figure 5B:
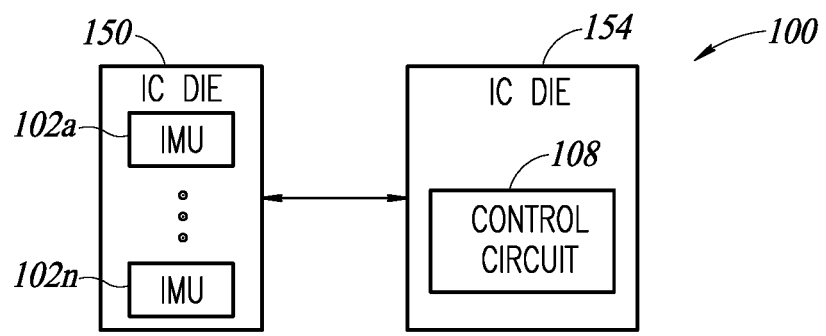
FIG. 5B is a block diagram of a sensor system, according to one embodiment.

FIG. 5B is a block diagram of a sensor system 100, according to one embodiment. Each of the IMUs 102 are implemented in a same integrated circuit die 150. The control circuit 108 is implemented in an integrated circuit die 154.

Figure 5C:
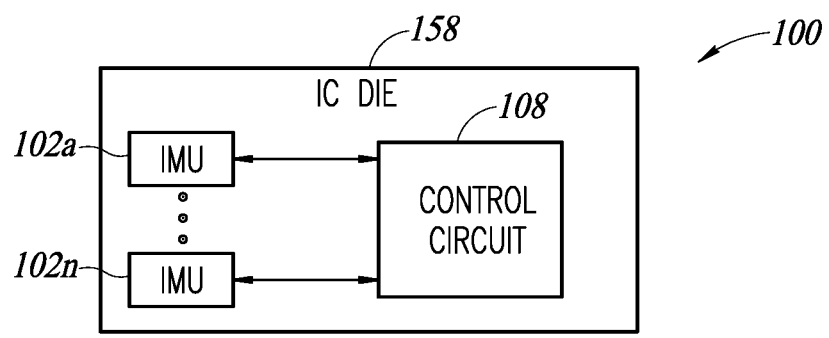
FIG. 5C is a block diagram of a sensor system, according to one embodiment.

FIG. 5C is a block diagram of a sensor system 100, according to one embodiment. In FIG. 5C, each of the IMUs 102 and the control circuit 108 are implemented in a single integrated circuit die 158. Various other configurations may be used for sensor system 100 without departing from the scope of the present disclosure.

Figure 6:
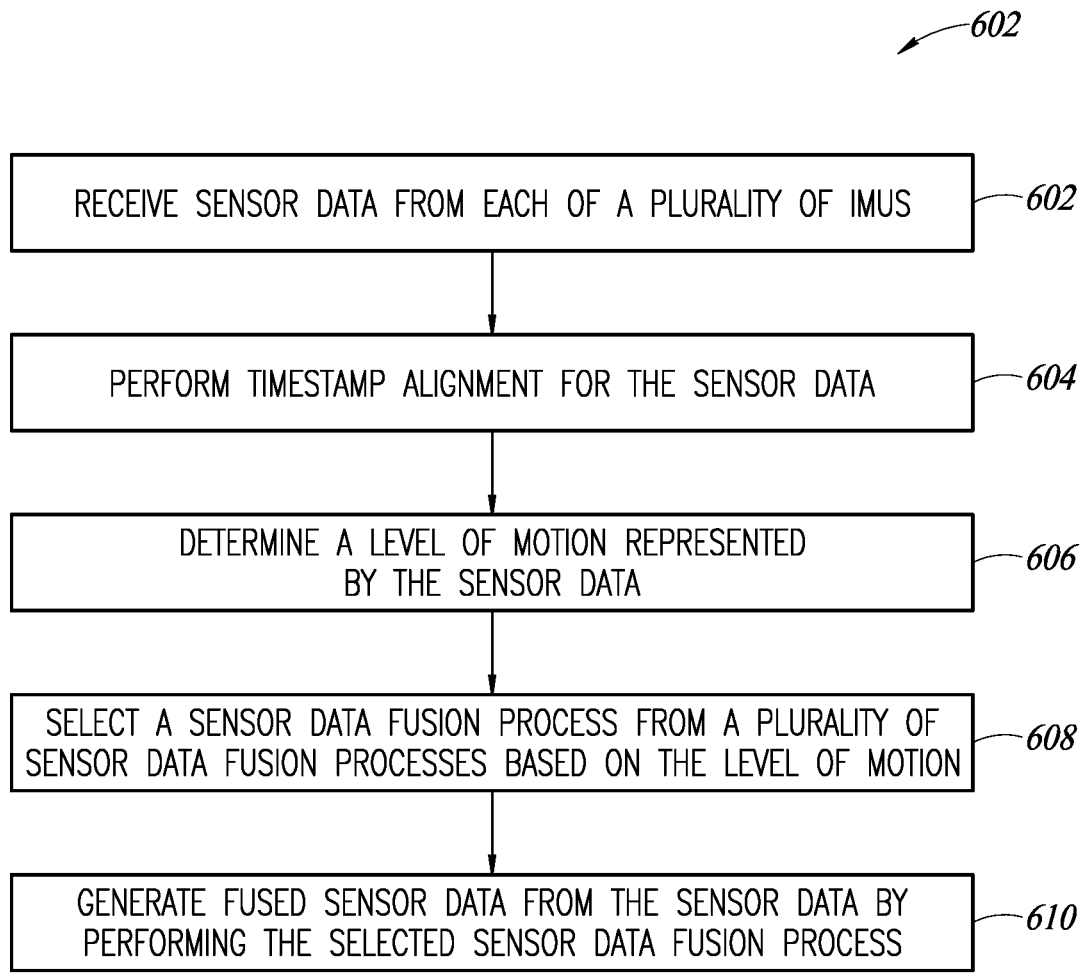
FIG. 6 is a flow diagram of a method for operating a sensor system, according to one embodiment.

FIG. 6 is a flow diagram of a method 600 for operating a sensor system, according to one embodiment. The method 600 can utilize processes, components, and systems described in relation to FIGS. 1-5C. At 602, the method 600 includes receiving sensor data from each of a plurality of IMUs. At 604, the method 600 includes performing timestamp alignment for the sensor data. At 606, the method 600 includes determining a level of motion represented by the sensor data. At 608, the method 600 includes selecting a sensor data fusion process from a plurality of sensor data fusion processes based on the level of motion. At 610, the method 600 includes generating fused sensor data from the sensor data by performing the selected sensor data fusion process.

Figure 7:
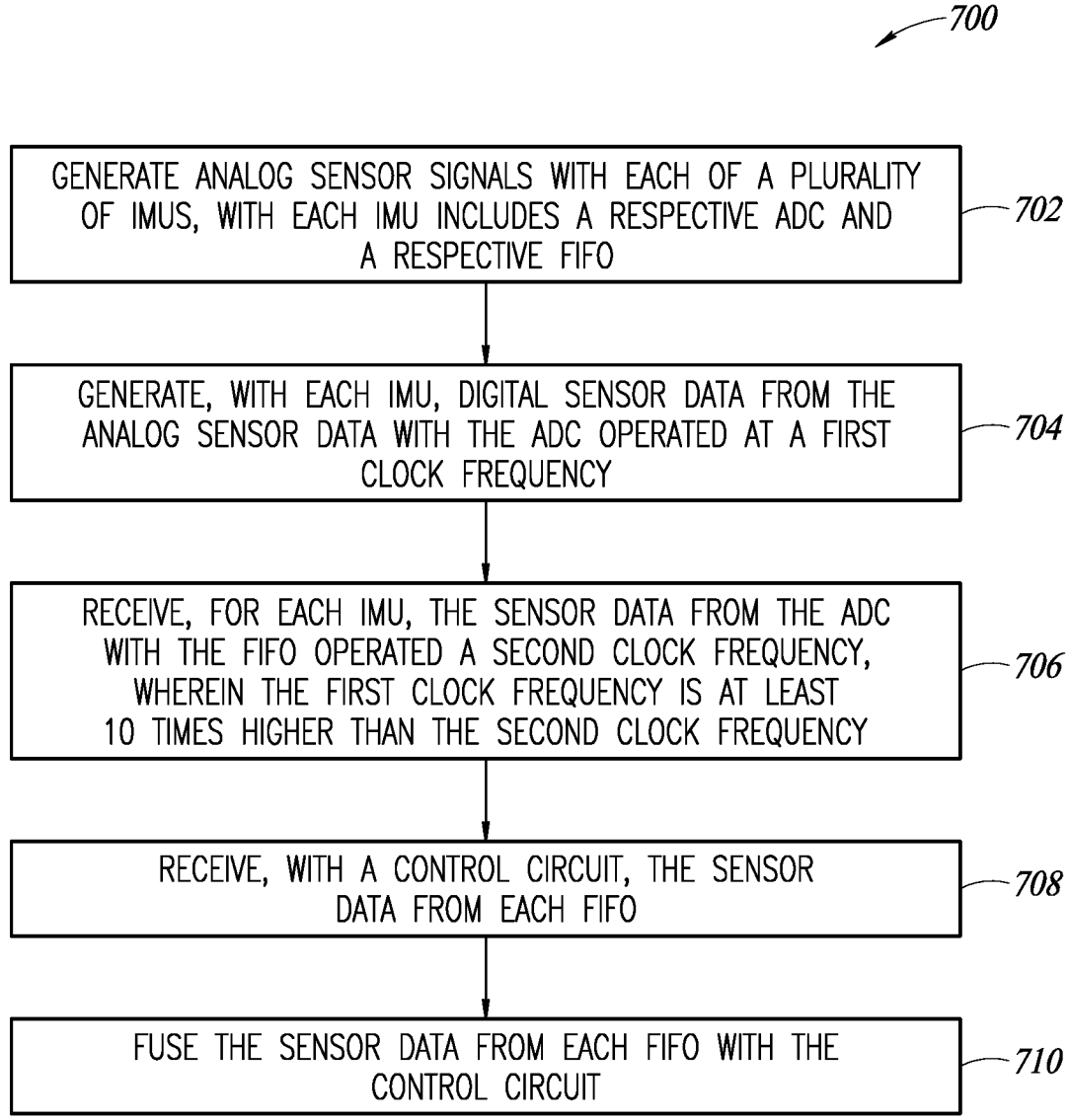
FIG. 7 is a flow diagram of a method for operating a sensor system, according to one embodiment.

FIG. 7 is a flow diagram of a method 700 for operating a sensor system, according to one embodiment. The method 700 can utilize processes, components, and systems described in relation to FIGS. 1-6. At 702, the method 700 includes generating analog sensor signals with each of a plurality of IMUs, wherein each IMU includes a respective ADC and a respective FIFO. At 704, the method 700 includes generating, with each IMU, digital sensor data from the analog sensor data with the ADC operated at a first clock frequency. At 706, the method 700 includes receiving, for each IMU, the sensor data from the ADC with the FIFO operated a second clock frequency, wherein the first clock frequency is at least 5 times higher than the second clock frequency. At 708, the method 700 includes receiving, with a control circuit, the sensor data from each FIFO. At 710, the method 700 includes fusing the sensor data from each FIFO with the control circuit.

Figure 8A:
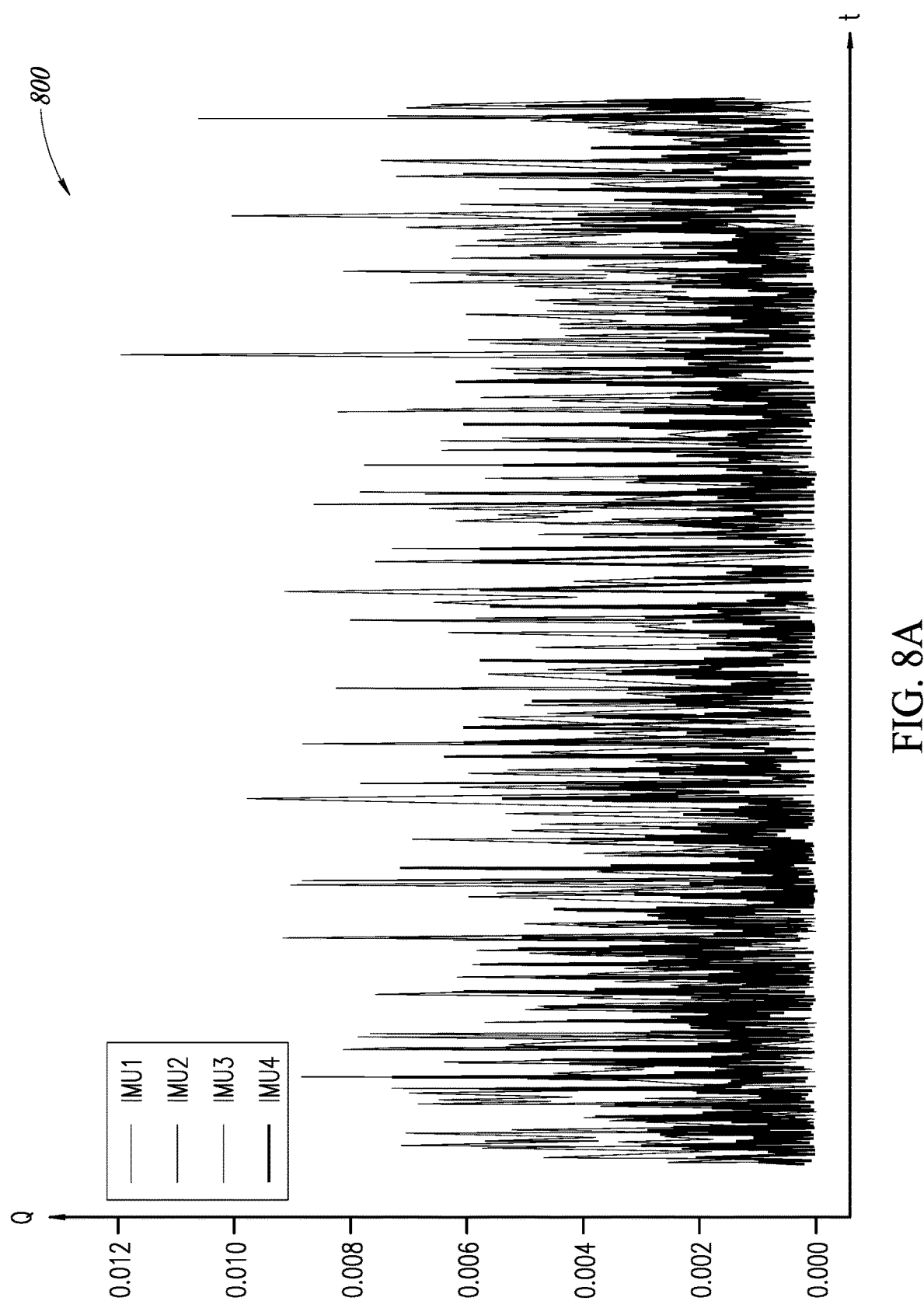
FIGS. 8A and 8B are graphs illustrating the quality factor for a plurality of inertial measurement units, according to one embodiment.

FIG. 8A is a graph 800 illustrating a quality factor associated with a plurality of IMUs, according to one embodiment. The quality factor is generated by the data fusion module 110. The graph 800 illustrates an example in which the high dynamics fusion algorithm is implemented. A lower value quality factor indicates a higher level of trust by the data fusion module 110. In the graph 800, the fourth IMU has the best quality factor and is, therefore, most trusted by the data fusion module 110.

Figure 8B:
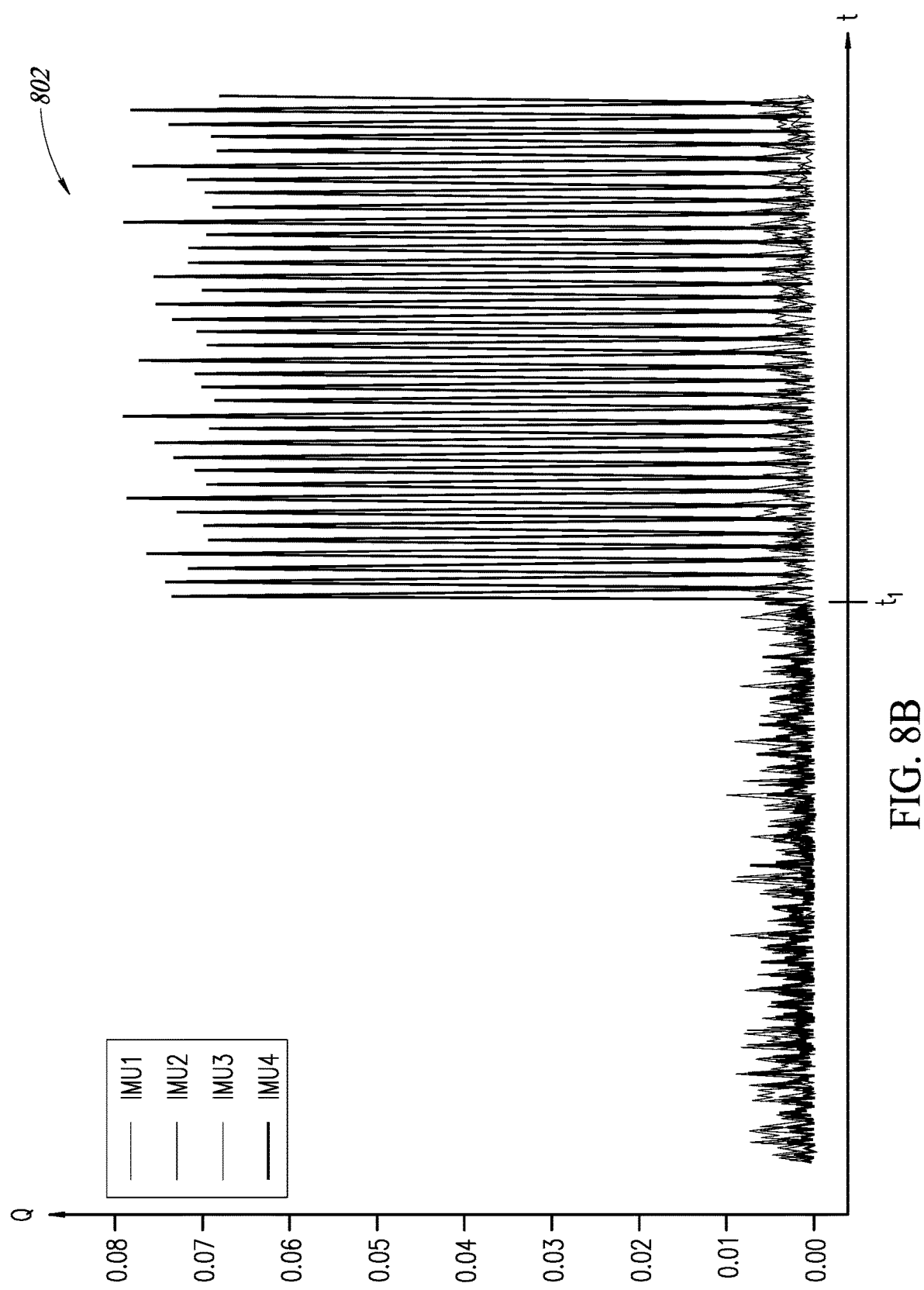

FIG. 8B is a graph 802 illustrating a quality factor associated with a plurality of IMUs, according to one embodiment. The quality factor is generated by the data fusion module 110. The graph 802 illustrates an example in which the high dynamics fusion algorithm is implemented. In the graph 802, the fourth IMU initially has the best quality factor. However, at time t1, the fourth IMU is turned off. As a result, the quality factor for the fourth IMU jumps to a very high value, indicating an immediate reduction in trust of the fourth IMU. Accordingly, fusion module 110 generates very effective quality factor values for the IMUs. In one embodiment, a method includes generating sensor data with each of a plurality of inertial measurement units of a sensor system, aligning timestamps of the sensor data, and determining a level of motion represented by the sensor data. The method includes selecting a sensor data fusion process from a plurality of sensor data fusion processes based on the level of motion generating fused sensor data from the sensor data by performing the selected sensor data fusion process.

In one embodiment, a method includes generating analog sensor signals with each of a plurality of inertial measurement units of a sensor system. Each inertial measurement unit includes a respective analog-to-digital converter and a respective first in, first out memory. The method includes generating, with each inertial measurement unit, digital sensor data from the analog sensor data with the analog-to-digital converter operated at a first clock frequency and receiving, for each inertial measurement unit, the sensor data from the analog-to-digital converter with the first in, first out memory operated a second clock frequency, wherein the first clock frequency is at least 10 times higher than the second clock frequency. The method includes, outputting, for each inertial measurement unit, the sensor data from the first in, first out memory.

In one embodiment, a sensor system includes a plurality of inertial measurement units and a control circuit. The control circuit is configured to receive sensor data from each of the inertial measurement units, to determine whether the sensor data indicates a low state of motion or a high state of motion, to fuse the sensor data with a low dynamics sensor data fusion algorithm if the sensor data indicates the low state of motion, and to fuse the sensor data with a high dynamics sensor data fusion algorithm if the sensor data indicates the high state of motion.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    generating sensor data with each of a plurality of inertial measurement units of a sensor system;
    aligning timestamps of the sensor data;
    determining a level of motion represented by the sensor data;
    selecting a sensor data fusion process from a plurality of sensor data fusion processes based on the level of motion; and
    generating fused sensor data from the sensor data by performing the selected sensor data fusion process.

2. The method of claim 1, wherein aligning the timestamps includes, for each inertial measurement unit:
    operating an analog-to-digital converter of the inertial measurement unit with a first clock signal having a first frequency;
    passing the sensor data from the analog-to-digital converter to a signal conditioner;
    conditioning the sensor data with the signal conditioner;
    passing the sensor data from the signal conditioner to a first in, first out memory; and
    operating the first in, first out memory with a second clock signal having a second frequency, wherein the first frequency is at least 10 times higher than the second frequency.

3. The method of claim 2, wherein the first frequency is at least 5 times higher than the second frequency.

4. The method of claim 2, wherein aligning the timestamps includes aligning rising edges of the sensor data from each first in, first out memory within a time value less than a period of the first clock signal.

5. The method of claim 1, wherein the plurality of sensor fusion processes includes a low dynamics sensor data fusion process and a high dynamics sensor data fusion process.

6. The method of claim 5, comprising determining, with a control circuit of the sensor system, if the sensor data indicates to a substantially stationary state of motion.

7. The method of claim 6, comprising:
    selecting the low dynamics sensor data fusion process if the sensor data indicates the substantially stationary state of motion; and selecting the high dynamics sensor data fusion process if the sensor data if the sensor data does not indicate the substantially stationary state of motion.

8. The method of claim 7, wherein the low dynamics sensor data fusion process includes computing average values of data values of the sensor data.

9. The method of claim 7, wherein the high dynamics sensor data fusion process includes performing a Kalman filtering process on the sensor data.

10. The method of claim 1, comprising generating a quality factor for each of the inertial measurement units.

11. The method of claim 1, comprising generating Euler angles based on the fused sensor data.

12. A method, comprising:
generating analog sensor signals with each of a plurality of inertial measurement units of a sensor system, wherein each inertial measurement unit includes a respective analog-to-digital converter and a respective first in, first out memory;
generating, with each inertial measurement unit, digital sensor data from the analog sensor signals with the analog-to-digital converter operated at a first clock frequency;
receiving, for each inertial measurement unit, the sensor data from the analog-to-digital converter with the first in, first out memory operated a second clock frequency, wherein the first clock frequency is at least 5 times higher than the second clock frequency; and
outputting, for each inertial measurement unit, the sensor data from the first in, first out memory.

13. The method of claim 12, comprising:
receiving, with a control circuit of the sensor system, the sensor data from each first in, first out memory; and
fusing the sensor data from each first in, first out memory with the control circuit.

14. The method of claim 12, comprising determining, with a control circuit, whether or not the sensor data indicates a substantially stationary state.

15. The method of claim 14, comprising:
fusing the sensor data with a low dynamics fusion process if the sensor data indicates a substantially stationary state; and
fusing the sensor data with a high dynamics fusion process if the sensor data indicates sensor data does not indicate a substantially stationary state.

16. The method of claim 13, wherein fusing the sensor data includes generating, from a plurality of sensor data vectors each from a respective inertial measurement unit, a single fused sensor data vector.

17. The method of claim 12, wherein receiving the sensor data from the analog-to-digital converter includes:
passing the sensor data from the analog-to-digital converter to a signal conditioner;
conditioning the sensor data with the signal conditioner; and
receiving the sensor data from the signal conditioner with the first in, first out memory.

18. A sensor system, comprising:
a plurality of inertial measurement units; and
a control circuit configured to receive sensor data from each of the inertial measurement units, to determine whether the sensor data indicates a low state of motion or a high state of motion, to fuse the sensor data with a low dynamics sensor data fusion algorithm if the sensor data indicates the low state of motion, and to fuse the sensor data with a high dynamics sensor data fusion algorithm if the sensor data indicates the high state of motion.

19. The sensor system of claim 18, wherein each inertial measurement unit includes, respectively:
an inertial sensor configured to generate analog sensor signals;
an analog-to-digital converter coupled to the inertial sensor and configured to convert the analog sensor signals to the sensor data in accordance with a first clock signal having a first frequency; and
a first in, first out memory coupled to signal conditioning block which is coupled to the analog-to-digital converter and configured to sample the sensor data from the analog-to-digital converter in accordance with a second clock signal having a second frequency, wherein the first frequency is at least five times greater than the second frequency.

20. The sensor system of claim 18, wherein the control circuit includes a data fusion module configured to execute the low dynamics sensor data fusion algorithm and the high dynamics sensor data fusion algorithm.

21. The sensor system of claim 20, wherein the control circuit is configured to generate Euler angles from the fused sensor data.

* * * * *